United States Patent
Ould-Brahim et al.

(10) Patent No.: US 10,506,037 B2
(45) Date of Patent: Dec. 10, 2019

(54) DISCOVERY OF INGRESS PROVIDER EDGE DEVICES IN EGRESS PEERING NETWORKS

(71) Applicants: Hamid Ould-Brahim, Lamata (CA); Reda Laichi, Ottawa (CA); Mustapha Aissaoui, Kanata (CA); Anand Thiagarajan, Kanata (CA)

(72) Inventors: Hamid Ould-Brahim, Lamata (CA); Reda Laichi, Ottawa (CA); Mustapha Aissaoui, Kanata (CA); Anand Thiagarajan, Kanata (CA)

(73) Assignee: Alcatel Lucent, Nozay (FR)

( * ) Notice: Subject to any disclaimer, the term of this patent is extended or adjusted under 35 U.S.C. 154(b) by 335 days.

(21) Appl. No.: 15/377,735

(22) Filed: Dec. 13, 2016

(65) Prior Publication Data
US 2018/0167458 A1 Jun. 14, 2018

(51) Int. Cl.
*H04L 29/08* (2006.01)
*H04L 12/771* (2013.01)
(Continued)

(52) U.S. Cl.
CPC .......... *H04L 67/1065* (2013.01); *H04L 41/04* (2013.01); *H04L 41/06* (2013.01);
(Continued)

(58) Field of Classification Search
CPC . H04L 42/12; H04L 41/0668; H04L 41/0896; H04L 45/00; H04L 45/16;
(Continued)

(56) References Cited

U.S. PATENT DOCUMENTS 9,253,097 B1 * 2/2016 Barman ................ H04L 47/122
9,270,426 B1 * 2/2016 Atlas ................. H04W 72/0466
(Continued)

FOREIGN PATENT DOCUMENTS

| EP | 2 933 958 A1 | 3/2015 |
| WO | WO 2016/155330 A1 | 10/2016 |
| WO | WO 2016/177404 A1 | 11/2016 |

OTHER PUBLICATIONS

Open Networking Foundation, "OpenFlow Switch Specification," Version 1.4.0, Oct. 14, 2013, pp. 1-206.
(Continued)

*Primary Examiner* — Chi Ho A Lee
(74) *Attorney, Agent, or Firm* — Tong, Rea, Bentley & Kim, LLC (57) ABSTRACT

The present disclosure generally discloses improvements in computer performance in communication networks, which may include improvements in computer performance in supporting discovery of ingress provider edge (PE) devices in a communication network using egress peer engineering (EPE) and software defined networking (SDN). The ingress PE devices of a network may have peering relationships with an egress peer link of an egress peer node of the network. The ingress PE devices may be discovered by identifying a set of traffic flows on an egress peer link of an egress peer node, identifying a set of ingress PE devices that have peering relationships with the egress peer node, determining bandwidth usage information, selecting, from the set of ingress PE devices based on the bandwidth usage information, a set of selected ingress PE devices, and initiating a management action for at least one of the selected ingress PE devices.

13 Claims, 6 Drawing Sheets

(51) Int. Cl.
*H04L 12/24* (2006.01)
*H04L 12/913* (2013.01)
*H04L 12/26* (2006.01)
*H04L 12/721* (2013.01)
*H04L 12/715* (2013.01)
*H04L 12/717* (2013.01)
*H04L 12/803* (2013.01)

(52) U.S. Cl.
CPC .......... *H04L 41/08* (2013.01); *H04L 41/0896* (2013.01); *H04L 43/0882* (2013.01); *H04L 45/04* (2013.01); *H04L 45/38* (2013.01); *H04L 45/42* (2013.01); *H04L 45/56* (2013.01); *H04L 47/122* (2013.01); *H04L 47/724* (2013.01); *H04L 67/104* (2013.01)

(58) Field of Classification Search
CPC ......... H04L 45/56; H04L 45/02; H04L 47/10; H04L 47/11; H04L 47/122
See application file for complete search history.

(56) References Cited

U.S. PATENT DOCUMENTS

| | | | | |
|---|---|---|---|---|
| 9,344,359 | B1* | 5/2016 | Tiruveedhula | H04L 45/50 |
| 9,729,473 | B2* | 8/2017 | Haramaty | H04L 49/557 |
| 2014/0146664 | A1* | 5/2014 | Amante | H04L 45/50 |
| | | | | 370/228 |
| 2015/0103659 | A1* | 4/2015 | Iles | H04L 47/11 |
| | | | | 370/235 |
| 2015/0109902 | A1* | 4/2015 | Kumar | H04L 41/0668 |
| | | | | 370/219 |
| 2015/0200802 | A1* | 7/2015 | Sawal | H04L 45/22 |
| | | | | 370/228 |
| 2015/0304206 | A1* | 10/2015 | Filsfils | H04L 45/04 |
| | | | | 709/238 |
| 2016/0330111 | A1* | 11/2016 | Manghirmalani | H04L 43/028 |
| 2017/0078176 | A1* | 3/2017 | Lakshmikantha | H04L 43/0852 |
| 2017/0208011 | A1* | 7/2017 | Bosch | H04L 47/25 |
| 2017/0324625 | A1* | 11/2017 | Meirosu | H04L 43/026 |
| 2017/0366426 | A1* | 12/2017 | Li | H04W 76/10 |
| 2018/0103091 | A1* | 4/2018 | Kwak | H04L 41/5041 |
| 2019/0020627 | A1* | 1/2019 | Yuan | G06F 9/45558 |
| 2019/0075041 | A1* | 3/2019 | Wang | H04L 41/0806 |

OTHER PUBLICATIONS

Previdi, et al., "Segment Routing Egress Peer Engineering BGP-LS Extensions," [bgp-ls-epedraft-ietf-idr-bgpls-segment-routing-epe-02], draft-ietf-idr-bgpls-segment-routing-epe, Dec. 21, 2015.
Filsfils, et al., "Segment Routing Centralized Egress Peer Engineering," [draft-ietf-spring-segment-routing-07], draft-ietf-spring-segment-routing-central-epe, Dec. 21, 2015.
International Search Report and Written Opinion of corresponding PCT/IB2017/001669 dated Jun. 21, 2018, 14 pages.

* cited by examiner

DISCOVERY OF INGRESS PROVIDER EDGE DEVICES IN EGRESS PEERING NETWORKS

TECHNICAL FIELD

The present disclosure relates generally to communication networks and, more particularly but not exclusively, to providing various improvements in computer performance for discovery of ingress provider edge devices in a communication network using egress peer engineering and software defined networking.

BACKGROUND

In communication networks, various combinations of communications technologies may be employed in order to support communication of data between endpoints. For example, egress peer engineering (EPE), in which an ingress provider edge (PE) router may be instructed to use a particular egress peer router and associated external interface in order to reach a particular destination, may be used to support communication of data between a source and the destination. Additionally, for example, software defined networking (SDN), in which the control plane is disassociated from the data plane, may be used to support configuration of a communication network to use egress peer engineering (e.g., via installation of flow rules in ingress PE routers and egress peer routers).

SUMMARY

The present disclosure generally discloses improvements in computer performance in communication networks, including improvements in computer performance for supporting the discovery of ingress provider edge devices in a communication network using egress peer engineering (EPE) and software defined networking (SDN).

In at least some embodiments, an apparatus for improving computer performance is provided. The apparatus includes a processor and a memory communicatively connected to the processor. The processor is configured to identify a traffic flow on an egress peer link of an egress peer node. The processor is configured to identify a set of ingress provider edge (PE) devices that have peering relationships with the egress peer node. The processor is configured to determine, for the ingress PE devices based on respective sets of flow statistics associated with the respective ingress PE devices, respective bandwidth usages of the egress peer link by the respective ingress PE devices for the traffic flow. The processor is configured to select, from the set of ingress PE devices based on the respective bandwidth usages of the egress peer link by the respective ingress PE devices for the traffic flow, a selected ingress PE device. The processor is configured to initiate a management action for the selected ingress PE device. In at least some embodiments, a corresponding method is provided. In at least some embodiments, a non-transitory computer-readable storage medium stores instructions which, when executed by a computer, cause the computer to perform a corresponding method.

In at least some embodiments, an apparatus is provided. The apparatus includes a processor and a memory communicatively connected to the processor. The processor is configured to identify a set of traffic flows on an egress peer link of an egress peer node. The processor is configured to identify a set of ingress provider edge (PE) devices that have peering relationships with the egress peer node. The processor is configured to determine bandwidth usage information including, for each combination of each of the traffic flows and each of the ingress PE devices, a respective bandwidth usage of the egress peer link by the respective ingress PE device for the respective traffic flow. The processor is configured to select, from a set of ingress PE devices based on the bandwidth usage information, a set of selected ingress PE devices. The processor is configured to initiate a management action for one of the selected ingress PE devices. In at least some embodiments, a corresponding method is provided. In at least some embodiments, a non-transitory computer-readable storage medium stores instructions which, when executed by a computer, cause the computer to perform a corresponding method.

In at least some embodiments, an apparatus is provided. The apparatus includes a processor and a memory communicatively connected to the processor. The processor is configured to send, from an ingress provider edge (PE) device toward a first egress peer link of an egress peer node having a peering relationship with the ingress PE device, a first data packet of a traffic flow. The processor is configured to receive, from a controller, a control message indicative of a redirection of the traffic flow from the first egress peer link to a second egress peer link associated with the first egress peer link. The processor is configured to send, from the ingress PE router toward the second egress peer link, a second data packet of the traffic flow. In at least some embodiments, a corresponding method is provided. In at least some embodiments, a non-transitory computer-readable storage medium stores instructions which, when executed by a computer, cause the computer to perform a corresponding method.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses improvements in computer performance in communication networks, including improvements in computer performance to support the discovery of ingress provider edge (PE) devices in communication networks using egress peer engineering (EPE) and software defined networking (SDN). The discovery of ingress PE devices may include discovery of a set of ingress PE devices providing data to an egress peer link of an egress peer node for a set of traffic flows. The discovery of ingress PE devices may include, for a set of traffic flows on an egress peer link (e.g., the top N traffic flows on the egress peer link, where N≥1), discovery of a set of ingress PE devices directing traffic of the traffic flows to the egress peer link (e.g., the top M ingress PE devices that are directing traffic of the traffic flows to the egress peer link, where M≥1). The discovery of the set of ingress PE devices directing traffic of the traffic flows to the egress peer link may include identifying the set of traffic flows on the egress peer link (e.g., the top N traffic flows), identifying a set of ingress PE devices associated with the egress peering node (which may include ingress PE devices directing traffic of the traffic flows to the egress peer link as well as ingress PE devices directing traffic of other traffic flows to the egress peer link), and identifying the set of ingress PE devices directing traffic of the traffic flows to the egress peer link (e.g., the top M ingress PE devices out of the set of ingress PE devices associated with the egress peer link). The discovery of the ingress PE devices may be used for various management purpose (e.g., intelligent traffic routing, intelligent traffic balancing, or the like). It will be appreciated that these and various other embodiments and potential advantages of ingress PE device discovery capabilities may be further understood by way of reference to the example communication network of FIG. 1.

Figure 1:
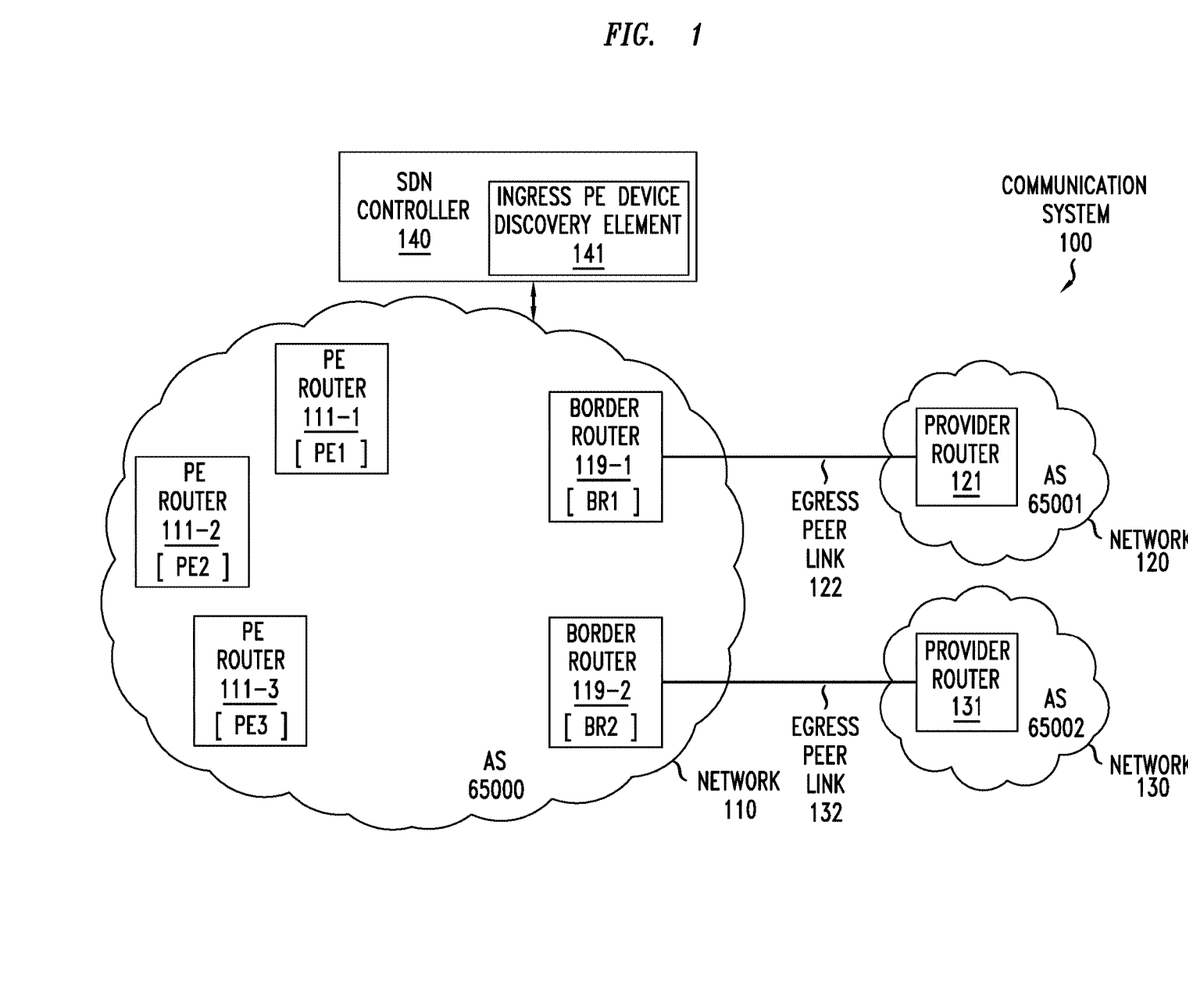
FIG. 1 depicts an example communication system for illustrating discovery of a set of ingress provider edge devices providing traffic to an egress peer link of an egress peer node for a set of traffic flows.

FIG. 1 depicts an example communication system for illustrating discovery of a set of ingress provider edge devices providing traffic to an egress peer link of an egress peer node for a set of traffic flows.

The communication system 100 includes a network 110, a network 120, a network 130, and a software defined networking (SDN) controller 140. The SDN controller 140 is configured to provide control functions for the network 110.

The network 110, the network 120, and the network 130 may be based on various communications technologies. For example, the network 110 may be an Internet Protocol (IP)/Multiprotocol Label Switching (MPLS) network. For example, the network 120 may be an IP network, an Ethernet network, or the like, as well as various combinations thereof. For example, the network 130 may be an IP network, an Ethernet network, or the like, as well as various combinations thereof. The network 110, the network 120, and the network 130 each may support various data plane technologies and capabilities (e.g., elements, protocols, or the like, as well as various combinations thereof), control plane technologies and capabilities (e.g., elements, protocols, or the like, as well as various combinations thereof), or the like, as well as various combinations thereof. The network 110, the network 120, and the network 130 may be based on various other communications technologies.

The network 110, the network 120, and the network 130 are configured as different autonomous systems and, thus, have different autonomous system numbers assigned thereto. For example, the network 110 has an autonomous system number of 65000 assigned thereto, the network 120 has an autonomous system number of 65001 assigned thereto, and the network 130 has an autonomous system number of 65002 assigned thereto. It will be appreciated that other autonomous system numbers may be used. It will be appreciated that the network 110, the network 120, and the network 130 may be owned or operated by different entities.

The network 110, the network 120, and the network 130 are configured to support transport of traffic flows. The traffic flows may include various traffic flow types which may transport various types of traffic. For example, the traffic flows may include video flows that are transporting video traffic, voice flows that are transporting voice traffic, data flows that are transporting data, or the like, as well as various combinations thereof.

The network 110 includes a set of ingress PE devices 111-1-111-3 (collectively, ingress PE devices 111). The ingress PE devices 111 may be routers, switches, or other suitable types of PE devices. The ingress PE devices 111 may be controlled by SDN controller 140. The ingress PE devices 111 may include flow rules tables and the SDN controller 140 may install flow rules into the flow rules table of the ingress PE devices 111 (e.g., flow forwarding rules for use by ingress PE devices 111 in forwarding packets of traffic flows, flow statistics collection rules for controlling collection of flow statistics at the ingress PE devices 111, or the like, as well as various combinations thereof). It is noted that the ingress PE devices 111 are referred to as ingress devices as the description primarily considers traffic flows proceeding in a direction from the network 110 toward the networks 120 and 130 (such that the ingress PE devices 111 are ingress points into the network 110 for the traffic flows); however, it will be appreciated that traffic may flow in both directions (and, thus, that, for traffic flows proceeding in a direction to the network 110 from the networks 120 and 130, the ingress PE devices 111 may be referred to as egress PE devices or egress peer nodes). It will be appreciated that traffic flows of network 110 may be defined in various ways (which may depend on the underlying communications technology of network 110), such as based on source/destination address pairs (e.g., source IP address and destination IP address), five-tuples (e.g., source IP address, source port number, destination IP address, destination port number, and protocol), route prefixes, subnets, or the like.

The network 110 includes a set of egress border routers (BRs) 119-1-119-2 (collectively, egress BRs 119). The egress BR 119-1 is a border router that is connected to the network 120 via an egress peer link 122. The egress BR 119-2 is a border router that is connected to the network 130 via an egress peer link 132. The egress BRs 119 may be considered to be autonomous system BRs (ASBRs) as these routers are operating at the border between networks operating as separate autonomous systems. The egress BRs 119 may be controlled by SDN controller 140. The egress BRs 119 may include flow rules tables and the SDN controller 140 may install flow rules into the flow rules table of the egress BRs 119 (e.g., flow forwarding rules for use by egress BRs 119 in forwarding packets of traffic flows, flow statistics collection rules for controlling collection of flow statistics at the egress BRs 119, or the like, as well as various combinations thereof). It is noted that the egress BRs 119 are referred to as egress devices as the description primarily considers traffic flows proceeding in a direction from the network 110 toward the networks 120 and 130 (such that the BRs 119 are egress points from network 110 for the traffic flows); however, it will be appreciated that traffic may flow in both directions (and, thus, that, for traffic flows proceeding in a direction to the network 110 from the networks 120 and 130, the egress BRs 119 may be referred to as ingress BRs or ingress PE devices).

The network 110 is configured to support egress peer engineering (EPE). In general, EPE is a network use case in which an ingress router (e.g., an ingress PE device 111) is instructed to use a specific egress peer router (e.g., egress BR 119-1 or egress BR 119-2) and a specific external interface (e.g., egress peer link 122 for egress BR 119-1 or egress peer link 132 for egress BR 119-2) to reach a particular destination. The EPE capabilities of network 110 may be based on a routing protocol, such as the Border Gateway Protocol (BGP) or other suitable type of protocol. The EPE capabilities of network 110 may be based on Segment Routing (SR) route advertisement. For example, the EPE capabilities of network 110 may be provided using one or more of Segment Routing Egress Peer Engineering BGP-LS Extensions (BGP-LS-EPE], Segment Routing Centralized Egress Peer Engineering [SR-EPE], or the like, as well as various combinations thereof. The network 110 is configured, based on EPE, such that each of the ingress PE devices 111 is associated with one of the egress BRs 119 such that the one of the egress BRs 119 with which the respective ingress PE device 111 is associated is an egress peer node for the respective ingress PE device 111. In the network 110, the egress BR 119-1 is the primary egress peer node for each of the ingress PE devices 111-1, 111-2, and 111-3, and, thus, the ingress PE devices 111-1, 111-2, and 111-3 may be considered to have peering relationships with egress BR 119-1. Similarly, in the network 110, the egress peer link 122 is the primary egress peer link for each of the ingress PE devices 111-1, 111-2, and 111-3, and, thus, the ingress PE devices 111-1, 111-2, and 111-3 may be considered to have peering relationships with egress peer link 122. In the network 110, the egress BR 119-2 is available as an alternate egress peer node for each of the ingress PE devices 111-1, 111-2, and 111-3. The egress BR 119-2 may be an alternate egress peer node for the ingress PE devices 111-1, 111-2, and 111-3 in the sense that the destinations of the traffic flows from the ingress PE devices 111-1, 111-2, and 111-3 are reachable via both egress BR 119-1 and egress BR 119-2. Similarly, in the network 110, the egress peer link 132 is available as an alternate egress peer link for each of the ingress PE devices 111-1, 111-2, and 111-3. It will be appreciated that, where EPE is based on BGP, the egress BRs 119 may be considered to be egress BGP peers nodes.

The network 110, as indicated above, is configured to support SDN. The ingress PE devices 111 and the egress BRs 119 may be configured to support communication with SDN controller 140. The ingress PE devices 111 and the egress BRs 119 may be controlled by the SDN controller 140 using SDN capabilities. For example, as indicated above, the ingress PE devices 111 and the egress BRs 119 may be configured with flow rules tables for providing various functions within network 110 based on SDN. The SDN capabilities of the network 110 may be provided using Open Flow or other suitable mechanisms for supporting software defined networking.

The network 110 may be configured to support various other functions and features. For example, network 110 may be configured to support BGP, which also may include support for BGP FlowSpec and other BGP-related capabilities. For example, network 110 may be configured to support Internet Protocol Flow Information Export (IPFIX). For example, network 110 may be configured to support the Resource Reservation Protocol (RSVP), which also may include support for the RSVP-Traffic Engineering (RSVP-TE) tunnel technology and other RSVP-related capabilities. The network 110 may be configured to support various other functions and features.

The network 110 may include various other network elements and communication links, which have been omitted from FIG. 1 for purposes of clarity.

The network 120 is a communication network configured to support communications of network 110. The network 120 includes a provider router 121. The provider router 121 of network 120 is connected to the egress BR 119-1 of network 110 via an egress peer link 122. The provider router 121 may be an ingress PE device configured to operate as an ingress point into network 120, from the egress BR 119-1 of the network 110, for traffic flows flowing in a direction from the network 110 to the network 120. The network 120 may be configured to transport the traffic flows received from the egress BR 119-1 for delivery to the intended destination(s) of the traffic flows. It will be appreciated that, although omitted from FIG. 1 for purposes clarity, network 120 may include various other network elements (e.g., routers, switches, controllers, or the like), communication links, or the like, as well as various combinations thereof.

The network 130 is a communication network configured to support communications of network 110. The network 130 includes a provider router 131. The provider router 131 of network 130 is connected to the egress BR 119-2 of network 110 via an egress peer link 132. The provider router 131 may be an ingress PE device configured to operate as an ingress point into network 130, from the egress BR 119-2 of the network 110, for traffic flows flowing in a direction from the network 110 to the network 130. The network 130 may be configured to transport the traffic flows received from the egress BR 119-2 for delivery to the intended destination(s) of the traffic flows. It will be appreciated that, although omitted from FIG. 1 for purposes clarity, network 130 may include various other network elements (e.g., routers, switches, controllers, or the like), communication links, or the like, as well as various combinations thereof.

The SDN controller 140 is configured to control the network 110 based on SDN, which may include controlling various elements of the network 110 (illustratively, ingress PE devices 111 and egress BRs 119) based on SDN. The SDN controller 140 includes an ingress PE device discovery element 141. The ingress PE device discovery element 141 is configured to perform various functions of the ingress PE device discovery capability. The ingress PE device discovery element 141 may be configured to perform various functions for discovering a set of ingress PE devices 111 providing traffic to an egress BR 119 for a set of traffic flows. The operation of SDN controller 140 and, more specifically, the ingress PE discovery element 141, may be further understood by way of reference to the example of FIG. 2 and the methods of FIGS. 3-4.

It will be appreciated that, although embodiments of the ingress PE device discovery capability are primarily presented herein within the context of a communication system using of specific numbers, types, and arrangements of networks and elements of those networks, various embodiments of the ingress PE device discovery capability may be provided within the context of communication systems using other numbers, types, and/or arrangements of networks (or elements of those networks).

Figure 2:
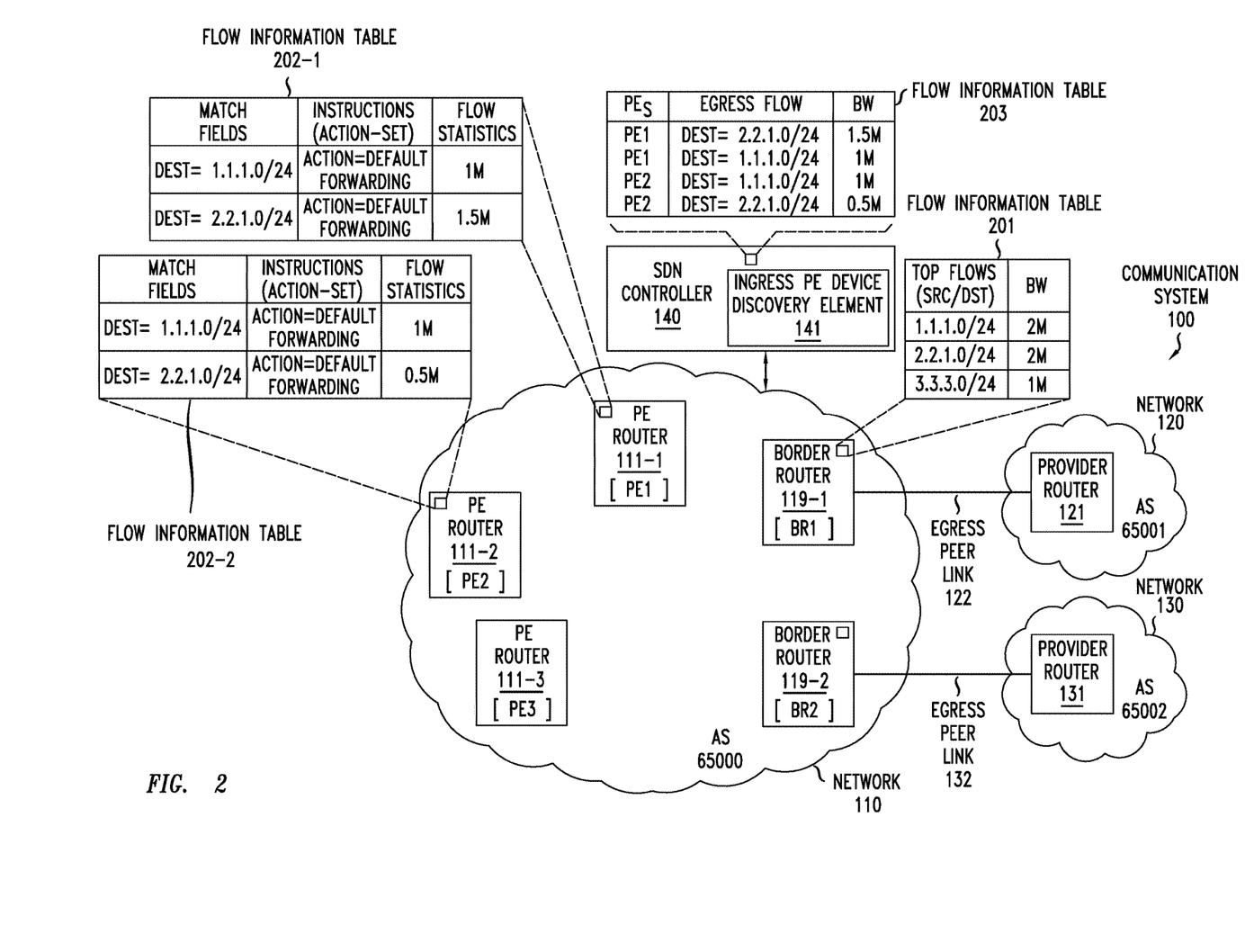
FIG. 2 depicts the communication system of FIG. 1 for illustrating an example of discovery of a set of ingress provider edge devices providing traffic to an egress peer link for a set of traffic flows.

FIG. 2 depicts the communication system of FIG. 1 for illustrating an example of discovery of a set of ingress provider edge devices providing traffic to an egress peer link for a set of traffic flows.

The communication system 100, as discussed above, includes the network 110, the network 120, the network 130, and the SDN controller 140. The SDN controller 140 is configured to discover a set of ingress PE devices (illustratively, a set of ingress PE devices 111) providing traffic to an egress peer link of an egress peer node (illustratively, egress peer link 122 associated with egress BR 119-1 or egress peer link 132 associated with egress BR 119-2) for a set of traffic flows.

The SDN controller 140 selects an egress peer link for which ingress PE device discovery is to be performed (which also may be referred to as an egress peer link of interest). The SDN controller 140 may select the egress peer link randomly, based on a schedule (e.g., using a periodic, round-robin cycling between selection of the various egress peer link available for selection, responsive to an indication of a condition on or associated with the egress peer link (e.g., a congestion condition indicative that the egress peer link is overloaded or is approaching an overload condition), or the like, as well as various combinations thereof. In the example of FIG. 2, it is assumed that the egress peer link 122 of the egress BR 119-1 is selected as the egress peer link for which ingress PE device discovery is to be performed.

The SDN controller 140 identifies a set of traffic flows on the egress peer node and the egress peer link for which ingress PE device discovery is to be performed (which also may be referred to as a set of traffic flows of interest or, more simply, traffic flows of interest). The traffic flows on the egress peer link may include all of the traffic flows on the egress peer link or a subset of the traffic flows on the egress peer link. The traffic flows may be the top N (N≥1) traffic flows on the egress peer link, which may be measured in terms of bandwidth. The SDN controller 140 may identify the set of traffic flows on the egress peer link based on flow information associated with the egress peer link. The flow information associated with the egress peer link may include per-flow bandwidth information that includes, for each of the traffic flows, an indication of the amount of bandwidth of the respective traffic flow that is supported by the egress peer link. The per-flow bandwidth information may be based on flow statistics which may be collected for the traffic flows on the egress peer node and the egress peer link. The flow information associated with the egress peer link may be received by the SDN controller 140 from the egress peer node (e.g., where the egress peer node is configured to collect and process flow statistics for traffic flows traversing the egress peer node in order to determine the flow information), determined by the SDN controller 140 based on information received by the SDN controller 140 from the egress peer node (e.g., based on processing of flow statistics received from the egress peer node), or the like, as well as various combinations thereof. In at least some embodiments, in which the egress peer node provides the flow information to the SDN controller 140, the configuration of the egress peer node by the SDN controller 140 to collect flow statistics and provide the flow information and the providing of the flow information to the SDN controller 140 may be based on a control protocol (e.g., OpenFlow, BGP FlowSpec, Netflow or the like). In at least some embodiments, in which the egress peer node provides flow statistics to the SDN controller 140 for use by the SDN controller to determine the flow information, the configuration of the egress peer node by the SDN controller 140 to collect flow statistics and provide the flow statistics to the SDN controller 140 may be based on a flow statistics collection protocol (e.g., Netflow IPFIX or the like), a control protocol (e.g., OpenFlow, BGP FlowSpec, or the like), or the like, as well as various combinations thereof. The egress peer node may already be configured to provide information to the SDN controller 140 at the time that the egress peer node is selected by the SDN controller 140 (e.g., based on previous installation of rules related to collection of flow statistics on the egress peer node), may be configured by the SDN controller 140 to provide information to the SDN controller 140 based on selection of the egress peer node by the SDN controller 140 (e.g., the SDN controller 140 installs rules related to collection of flow statistics on the egress peer node after selection of the egress peer node by the SDN controller 140), or the like. The identification of the set of traffic flows on the egress peer link may include selection of the set of traffic flows on the egress peer link from a set of available traffic flows on the egress peer link (e.g., selection of a particular subset of traffic flows from the full set of flows on the egress peer link, such as selection of the top N traffic flows on the egress peer link in terms of bandwidth consumption). In the example of FIG. 2, as indicated by the flow information of flow information table 201, the SDN controller 140 identifies the top three traffic flows, in terms of bandwidth consumption, on egress peer link 122 of egress BR 119-1. The top three traffic flows include a first traffic flow (which is indicated by a source/destination IP address pair of 1.1.1.0/24) for which egress peer link 122 of egress BR 119-1 supports 2.5 M, a second traffic flow (which is indicated by a source/destination IP address pair of 2.2.1.0/24) for which egress peer link 122 of BR 119-1 supports 2 M, and a third traffic flow (which is indicated by a source/destination IP address pair of 3.3.1.0/24) for which egress peer link 122 of BR 119-1 supports 1 M.

The SDN controller 140 identifies a set of ingress PE devices associated with the egress peer node. The set of ingress PE devices associated with the egress peer node may include the ingress PE devices having peering relationships (e.g., based on EPE) with the egress peer node. The SDN controller 140 may identify the set of ingress PE devices associated with the egress peer node based on one or more routing protocols (e.g., Border Gateway Protocol (BGP) or the like) running on the egress peer node. For example, where the egress peering node is running a routing protocol, the routing protocol neighbors of the egress peering node (which include the ingress PE devices associated with the egress peer node) may be determined based on the routing protocol. The SDN controller 140 may identify the set of ingress PE devices associated with the egress peer node based on prefix information. In the example of FIG. 2, the SDN controller 140 determines that ingress PE devices 111-1, 111-2, and 111-3 are all associated with the egress BR 119-1 (and, thus, with the egress peer link 122 of the egress BR 119-1).

The SDN controller 140 determines, for each of the ingress PE devices, a respective set of bandwidth usages of the egress peer link by the respective ingress PE device for the respective traffic flows. For example, for a given ingress PE device, the respective set of bandwidth usages of the egress peer link by the given ingress PE device may include, for each of the traffic flows for which the given ingress PE device is sourcing traffic to the egress peer link, an indication of an amount of bandwidth of the respective traffic flow that is propagated from the given ingress PE device to the egress peer link (which indicates the contribution of the given ingress PE device to congestion on the egress peer link due to the respective traffic flow). The sets of bandwidth usages of the egress peer link by the respective ingress PE devices may be determined based on respective sets of flow statistics of the respective ingress PE devices. For example, for a given ingress PE device, the respective set of bandwidth usages of the egress peer link by the given ingress PE device may be determined based on a respective set of flow statistics of the respective ingress PE device. The respective set of flow statistics of the respective ingress PE device related to the traffic flows provided from the respective ingress PE device to the egress peer link may be receive by the SDN controller from the given ingress PE device (e.g., based on flow statistics collection rules previously installed on the ingress PE device by the SDN controller 140, based on flow statistics collection rules installed on the ingress PE device responsive to identification of the given ingress PE device as sourcing traffic to the egress peer link for one or more of the traffic flows, or the like, as well as various combinations thereof). The installation of the flow statistics collection rules and associated reporting of the flow statistics by the ingress PE devices may be performed based on a flow-based protocol (e.g., OpenFlow, BGP FlowSpec, or the like). In the example of FIG. 2, as indicated by the flow information of flow information table 202-1 associated with ingress PE device 111-1, the SDN controller 140 determines, for each of the traffic flows traversing the egress peer link 122 of the egress BR 119-1 that is sourced from the ingress PE device 111-1, an indication of an amount of bandwidth of that traffic flow that is sent from ingress PE device 111-1 to the egress peer link 122 of the egress BR 119-1 (e.g., for the traffic flow denoted using 1.1.1.0/24 the ingress PE device 111-1 sends 1 M of data to the egress peer link 122 of the egress BR 119-1 and for the traffic flow denoted using 2.2.1.0/24 the ingress PE device 111-1 sends 1.5 M of data to the egress peer link 122 of the egress BR 119-1). Similarly, in the example of FIG. 2, as indicated by the flow information of flow information table 202-2 associated with ingress PE device 111-2, the SDN controller 140 determines, for each of the traffic flows traversing the egress peer link 122 of the egress BR 119-1 that is sourced from the ingress PE device 111-2, an indication of an amount of bandwidth of that traffic flow that is sent from the ingress PE device 111-2 to the egress peer link 122 of the egress BR 119-1 (e.g., for the traffic flow denoted using 1.1.1.0/24 the ingress PE device 111-2 sends 1 M of data to the egress peer link 122 of the egress BR 119-1 and for the traffic flow denoted using 2.2.1.0/24 the ingress PE device 111-2 sends 0.5 M of data to the egress peer link 122 of the egress BR 119-1).

The SDN controller 140 determines, based on the respective sets of bandwidth usages of the egress peer link by the respective ingress PE devices, per-PE/per-flow bandwidth usage information for the egress peer link (which, for at least some embodiments, also may be referred to more generally herein as bandwidth usage information). The per-PE/per-flow bandwidth usage information for the egress peer link includes, for each combination of each traffic flow and each ingress PE device providing traffic of the traffic flow to the egress peer link, a respective indication of the amount of bandwidth provided from the respective ingress PE device to the egress peer link for the respective traffic flow. In the example of FIG. 2, as indicated by the flow information of flow information table 203 (determined based on the flow information of flow information tables 202), the per-PE/per-flow bandwidth usage information includes an indication that ingress PE device 111-2 is sending 1.5 M of data to the egress peer link 122 of the egress BR 119-1 for traffic flow 2.2.1.0/24, ingress PE device 111-1 is sending 1 M of data to the egress peer link 122 of the egress BR 119-1 for traffic flow 1.1.1.0/24, ingress PE device 111-2 is sending 1 M of data to the egress peer link 122 of the egress BR 119-1 for traffic flow 1.1.1.0/24, and ingress PE device 111-2 is sending 0.5 M of data to the egress peer link 122 of the egress BR 119-1 for traffic flow 2.2.1.0/24.

The SDN controller 140 may initiate various management actions based on bandwidth usage information (e.g., the per-PE/per-flow bandwidth usage information for the egress peer link). It is noted that examples of some management actions which may be provided are discussed further below.

The SDN controller 140, for a given traffic flow contributing to congestion on the egress peer link (e.g., a traffic flow on the egress peer link that is identified as causing congestion on the egress peer link), may identify a set of ingress PE devices that are contributing to congestion of the given traffic flow on the egress peer link. The set of ingress PE devices that are contributing to congestion of the given traffic flow on the egress peer link may include all of the ingress PE devices sending traffic of the traffic flow to the egress peer link (which may include all or some of the ingress PE devices identified as being associated with the egress peer link) or a subset of the ingress PE devices sending traffic of the traffic flow to the egress peer link. The ingress PE devices sending traffic of the traffic flow to the egress peer link may include the top X (X≥1) ingress PE devices sending traffic of the traffic flow to the egress peer link. The SDN controller 140 may initiate a management action to attempt to alleviate the congestion on the egress peer link due to the traffic flow. The SDN controller 140 may select, from the set of ingress PE devices that are contributing to congestion of the given traffic flow on the egress peer link, a selected ingress PE device sending traffic to the egress peer link for the given traffic flow (e.g., the ingress PE device sending the most traffic to the egress peer link for the given traffic flow, the ingress PE device sending the next-to-most traffic to the egress peer link for the given traffic flow, or the like) and may initiate redirection of the traffic of the traffic flow from being sent from the selected ingress PE device to the egress peer link to being sent from the selected ingress PE device to an alternate egress peer link (e.g., of the same egress peer node or a different egress peer node). The SDN controller 140 may initiate redirection of the traffic of the traffic flow from being sent from the selected ingress PE device to the egress peer link to being sent from the selected ingress PE device to an alternate egress peer link by installing one or more flow forwarding rules for that traffic flow on the selected ingress PE device such that the selected ingress PE device forwards packets of the traffic flow to the alternate egress peer link rather than the egress peer link. The SDN controller 140 may initiate redirection of the traffic of the traffic flow from being sent from the selected ingress PE device to the egress peer link to being sent from the selected ingress PE device to an alternate egress peer link based on segment routing (e.g., using a segment routing tunnel), based on RSVP-TE (e.g., using an RSVP-TE tunnel), or the like, as well as various combinations thereof. In the example of FIG. 2, the SDN controller 140 may initiate redirection of a portion of the traffic of the traffic flow 2.2.1.0/24 from the egress peer link 122 of the egress BR 119-1 to the egress peer link 132 of the egress BR 119-2 which is the alternate egress peer link for the egress peer link 122 of the egress BR 119-1. The SDN controller 140, where it is determined that the traffic flow 2.2.1.0/24 is contributing to congestion on the egress peer link 122 of the egress BR 119-1, may use the per-PE/per-flow bandwidth usage information in flow information table 203 to determine that ingress PE device 111-1 and ingress PE device 111-2 are both sourcing traffic of the traffic flow 2.2.1.0/24 to the egress peer link 122 of the egress BR 119-1 and that ingress PE device 111-1 is sourcing more traffic of traffic flow 2.2.1.0/24 to the egress peer link 122 of the egress BR 119-1 (namely, 1.5 M) than the ingress PE device 111-2 (namely, 0.5 M). The SDN controller 140 may then configure ingress PE device 111-1 to redirect the traffic of the traffic flow 2.2.1.0/24 from being sent from ingress PE device 111-1 to the egress peer link 122 of the egress BR 119-1 to being sent from ingress PE device 111-1 to the egress peer link 132 of the egress BR 119-2. It is noted that, although primarily presented with respect to embodiments in which only a single ingress PE device sending traffic to the egress peer link for the given traffic flow is selected, in at least some embodiments multiple ingress PE devices sending traffic to the egress peer link may be selected for redirection of traffic of the traffic flow (e.g., the two ingress PE devices sending the greatest amount traffic to the egress peer link for the traffic flow, the three egress peer nodes sending the lowest amount of traffic to the egress peer link for the traffic flow, or the like). It will be appreciated that other selections for application of management actions are contemplated.

The SDN controller 140, for an egress peer link experiencing congestion, may identify a set of ingress PE devices that are contributing to congestion on the egress peer link. The set of ingress PE devices that are contributing to congestion on the egress peer link may include all of the ingress PE devices sending traffic to the egress peer link (which may include all or some of the ingress PE devices identified as being associated with the egress peer link) or a subset of the ingress PE devices sending traffic to the egress peer link (e.g., ones of the ingress PE devices sending an amount of traffic to the egress peer link that is greater than a threshold). The ingress PE devices sending traffic to the egress peer link may include the top X (X≥1) ingress PE devices sending traffic to the egress peer link. The SDN controller 140 may initiate a management action to attempt to alleviate the congestion on the egress peer link. The SDN controller 140 may select, from the set of ingress PE devices that are contributing to congestion on the egress peer link, a selected ingress PE device sending traffic to the egress peer link (e.g., the ingress PE device sending the most traffic to the egress peer link, the ingress PE device sending the next-to-most traffic to the egress peer link, or the like) and may initiate redirection of traffic from being sent from the selected ingress PE device to the egress peer link to being sent from the selected ingress PE device to an alternate egress peer link (e.g., of the same egress peer node or a different egress peer node). The SDN controller 140 may initiate redirection of traffic from being sent from the selected ingress PE device to the egress peer link to being sent from the selected ingress PE device to an alternate egress peer link by installing one or more flow forwarding rules on the selected ingress PE device for one or more traffic flows (e.g., for all traffic flows being sent from the selected ingress PE device to the egress peerlink, for a subset of traffic flows being sent from the selected ingress PE device to the egress peer link, or the like) such that the selected ingress PE device forwards packets of the one or more traffic flows to the alternate egress peer link rather than the egress peer link. In the example of FIG. 2, the SDN controller 140 may initiate redirection of the traffic of traffic flows 1.1.1.0/24 and 2.2.1.0/24 from being sent from ingress PE device 111-1 to the egress peer link 122 of the egress BR 119-1 to being sent from ingress PE device 111-1 to the egress peer link 132 of the egress BR 119-2. The SDN controller 140, where it is determined that the egress peer link 122 of the egress BR 119-1 is experiencing congestion, may use the per-PE/per-flow bandwidth usage information in flow information table 203 to determine that ingress PE device 111-1 and ingress PE device 111-2 are both sourcing traffic to the egress peer link 122 of the egress BR 119-1 and that ingress PE device 111-1 is sourcing more traffic to the egress peer link 122 of the egress BR 119-1 (namely, 2.5 M) than ingress PE device 111-2 (namely, 1.5 M). The SDN controller 140 may then configure ingress PE device 111-1 to redirect the traffic of traffic flows 1.1.1.0/24 and 2.2.1.0/24 from being sent from ingress PE device 111-1 to the egress peer link 122 of the egress BR 119-1 to being sent from ingress PE device 111-1 to the egress peer link 132 of the egress BR 119-2. It is noted that, although primarily presented with respect to embodiments in which only a single ingress PE device sending traffic to the egress peer link for the given traffic flow is selected, in at least some embodiments multiple ingress PE devices sending traffic to the egress peer link may be selected for redirection of traffic (e.g., the two ingress PE devices sending the greatest amount traffic to the egress peer link for the traffic flow, the three egress peer nodes sending the lowest amount of traffic to the egress peer link for the traffic flow, or the like). It will be appreciated that other selections for application of management actions are contemplated.

The SDN controller 140 may be configured to provide various other types of management actions based on the per-PE/per-flow bandwidth usage information for the egress peer link.

Figure 3:
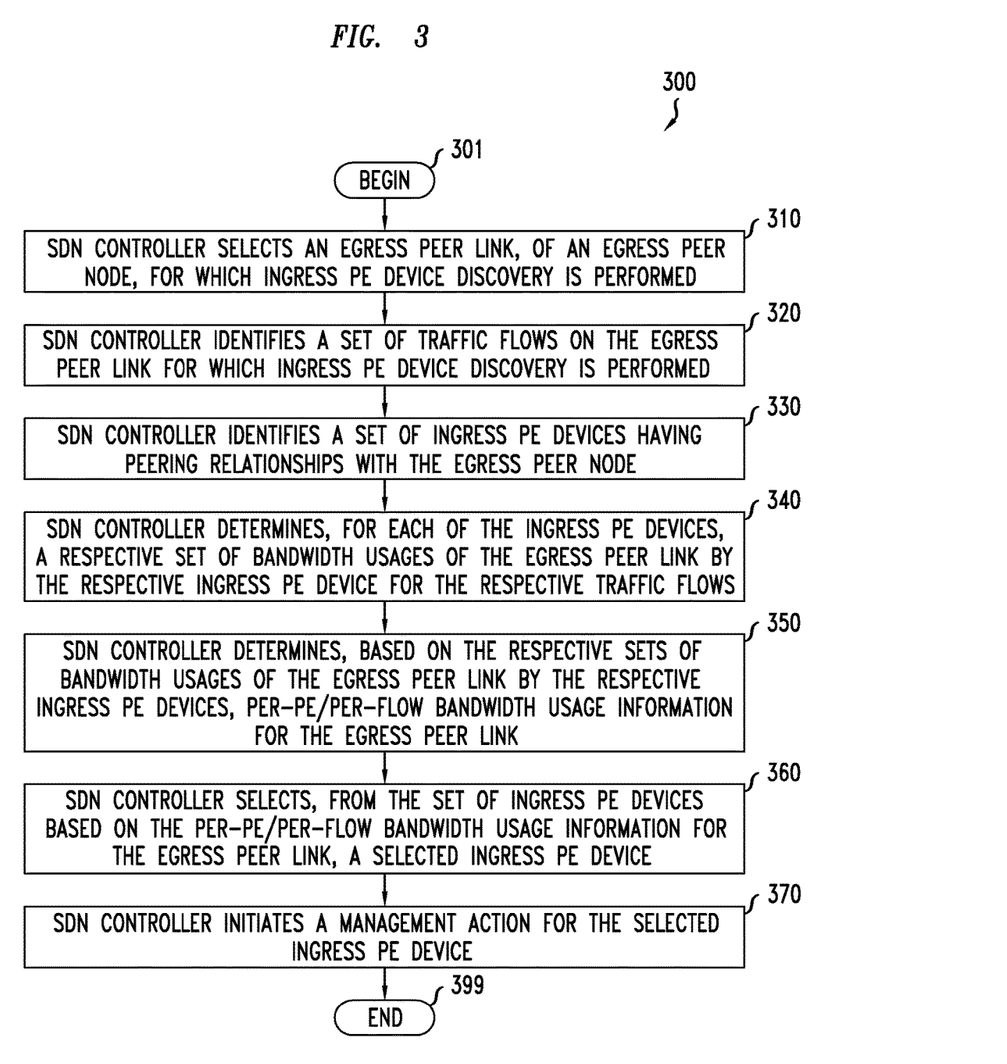
FIG. 3 depicts a method for use by an SDN controller in discovering a set of ingress provider edge devices providing traffic to an egress peer link for a set of traffic flows.

FIG. 3 depicts a method for use by an SDN controller in discovering a set of ingress provider edge devices providing traffic to an egress peer node for a set of traffic flows. It is noted that, although primarily presented in FIG. 3 as being performed serially, at least a portion of the functions of method 300 of FIG. 3 may be performed contemporaneously or in a different order than as presented in FIG. 3.

At block 301, method 300 begins.

At block 310, the SDN controller selects an egress peer link, of an egress peer node, for which ingress PE device discovery is to be performed.

At block 320, the SDN controller identifies a set of traffic flows on the egress peer link for which ingress PE device discovery is to be performed. This may include all of the traffic flows on the egress peer link or a subset of traffic flows on the egress peer link.

At block 330, the SDN controller identifies a set of ingress PE devices associated with the egress peer node. This may include a set of ingress PE devices peering with the egress peer node based on egress peer engineering. This may include a set of ingress PE devices peering with the egress peer link of the egress peer node based on egress peer engineering.

At block 340, the SDN controller determines, for each of the ingress PE devices, a respective set of bandwidth usages of the egress peer link by the respective ingress PE device for the respective traffic flows.

At block 350, the SDN controller determines, based on the respective sets of bandwidth usages of the egress peer link by the respective ingress PE devices, per-PE/per-flow bandwidth usage information for the egress peer link.

At block 360, the SDN controller selects, based on the per-PE/per-flow bandwidth usage information for the egress peer link, a selected ingress PE device. The selected ingress PE device is one of the ingress PE devices for which a management action is to be performed. The selected ingress PE device may be one of the ingress PE devices sourcing the most traffic to the egress peer link for one of the traffic flows (e.g., one of the traffic flows causing the most congestion on the egress peer link), one of the ingress PE devices sourcing the most traffic to the egress peer link, or the like.

At block 370, the SDN controller initiates a management action for the selected ingress PE device. The management action that is initiated for the selected ingress PE device may depend on the basis for selection of the selected ingress PE device. The management action may include redirecting traffic of a particular traffic flow (e.g., the traffic flow causing the most congestion on the egress peer link) from being provided from the selected ingress PE device to the egress peer link to being provided from the selected ingress PE devices to an alternate egress peer link associated with the egress peer link, redirecting traffic of multiple traffic flows (e.g., multiple traffic flows contributing to congestion on the egress peer link) from being provided from the selected ingress PE device to the egress peer link to being provided from the selected ingress PE devices to an alternate egress peer link, or the like. It will be appreciated that various other management actions may be initiated by the SDN controller for the selected ingress PE device.

At block 399, method 300 ends.

It will be appreciated that, although primarily directed to embodiments in which a single ingress PE device is selected for initiation of a management action, method 300 of FIG. 3 may be adapted such that multiple ingress PE devices may be selected for initiation of multiple management actions (e.g., redirecting traffic of a traffic flow from multiple ingress PE devices to one or more alternate egress peer link, redirecting traffic of multiple traffic flows from multiple ingress PE devices to one or more alternate egress peer link, or the like).

It will be appreciated that, although method 300 of FIG. 3 is primarily directed to discovery of a set of ingress PE devices providing traffic to an egress peer link for a set of traffic flows, the set of traffic flows may include a single traffic flow on the egress peer link (e.g., a traffic flow of interest, such as a traffic flow identified as causing or contributing to congestion on the egress peer node). Accordingly, an embodiment of ingress PE device discovery of a set of ingress PE devices providing traffic to an egress peer link for a single traffic flow is presented with respect to FIG. 4.

Figure 4:
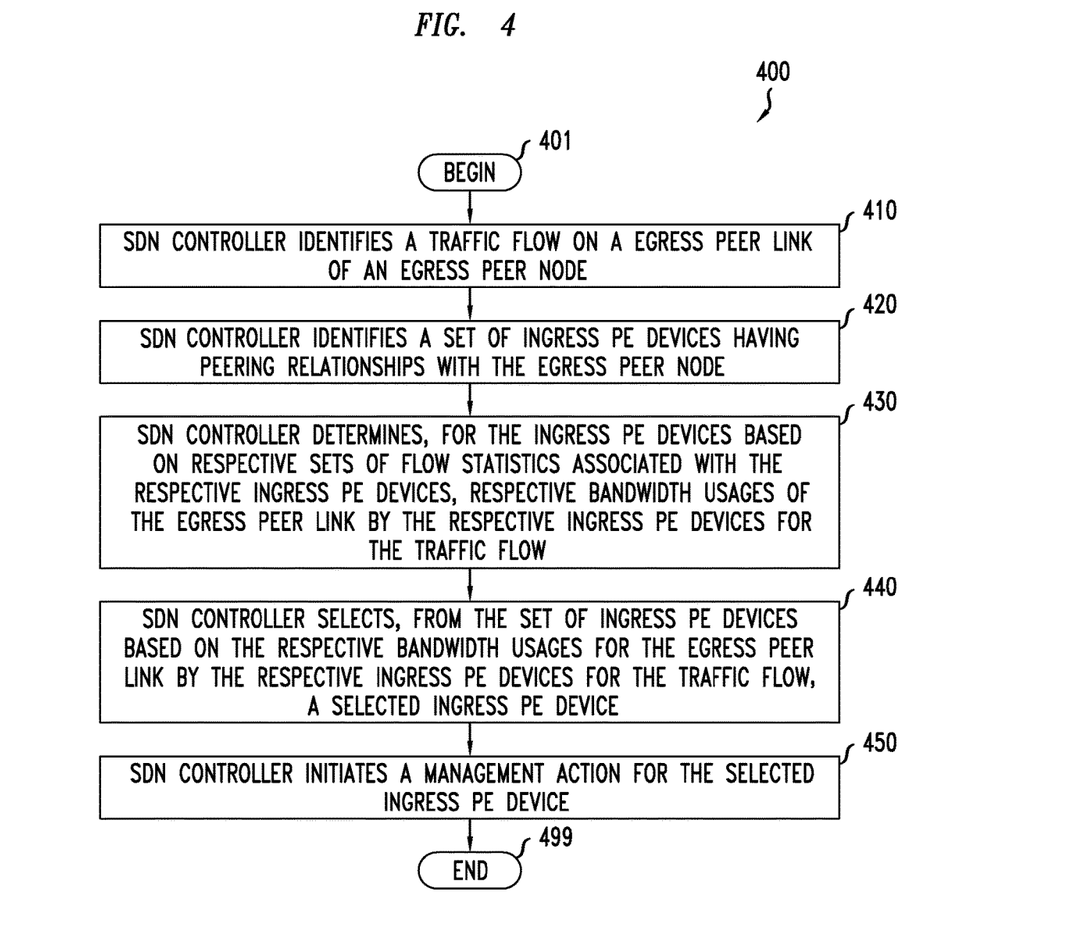
FIG. 4 depicts a method for use by an SDN controller in discovering a set of ingress provider edge devices providing traffic to an egress peer link for a traffic flow.

FIG. 4 depicts a method for use by an SDN controller in discovering a set of ingress provider edge devices providing traffic to an egress peer node for a traffic flow. It is noted that, although primarily presented in FIG. 4 as being performed serially, at least a portion of the functions of method 400 of FIG. 4 may be performed contemporaneously or in a different order than as presented in FIG. 4.

At block 401, method 400 begins.

At block 410, the SDN controller identifies a traffic flow on an egress peer link of an egress peer node.

At block 420, the SDN controller identifies a set of ingress PE devices having a peering relationship with the egress peer node.

At block 430, the SDN controller determines, for the ingress PE devices based on respective sets of flow statistics associated with the respective ingress PE devices, respective bandwidth usages of the egress peer link by the respective ingress PE devices for the traffic flow.

At block 440, the SDN controller selects, from the set of ingress PE devices based on the respective bandwidth usages of the egress peer link by the respective ingress PE devices for the traffic flow, a selected ingress PE device.

At block 450, the SDN controller initiates a management action for the selected ingress PE device.

At block 499, method 400 ends.

Figure 5:
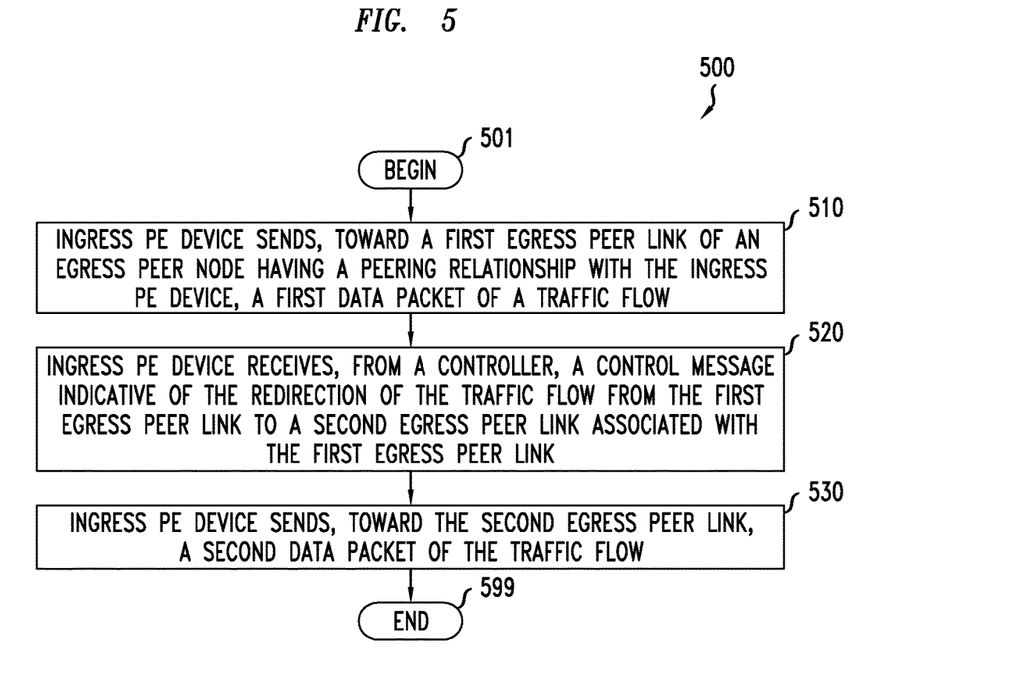
FIG. 5 depicts a method for use by an ingress provider edge device for redirecting traffic of a traffic flow from a first egress peer link to a second egress peer link.

FIG. 5 depicts a method for use by an ingress provider edge device for redirecting traffic of a traffic flow from a first egress peer link to a second egress peer link. It is noted that the first and second egress peer links may be on the same egress peer node or different egress peer nodes. It is noted that, although primarily presented in FIG. 5 as being performed serially, at least a portion of the functions of method 500 of FIG. 5 may be performed contemporaneously or in a different order than as presented in FIG. 5.

At block 501, method 500 begins.

At block 510, the ingress PE device sends, toward a first egress peer link having a peering relationship with the ingress PE device, a first data packet of a traffic flow.

At block 520, the ingress PE device receives, from a controller, a control message indicative of a redirection of the traffic flow from the first egress peer link to a second egress peer link associated with the first egress peer link.

At block 530, the ingress PE device sends, toward the second egress peer link, a second data packet of the traffic flow.

At block 599, method 500 ends.

It will be appreciated that, although primarily presented herein with respect to embodiments in which discovery of a set of ingress provider edge devices providing traffic to an egress peer link for a set of traffic flows is based on a congestion indicator associated with the egress peer link, discovery of a set of ingress provider edge devices providing traffic to an egress peer link for a set of traffic flows may be based on various other types of indicators which may be used as a basis for initiating management actions on the egress peer link (e.g., Key Performance Indicators (KPIs) or the like).

It will be appreciated that, although primarily presented herein with respect to embodiments in which discovery of a set of ingress provider edge devices includes discovery of a set of ingress provider edge devices providing traffic to an egress peer link for a set of traffic flows, in at least some embodiments the discovery of a set of ingress provider edge devices may include discovery of a set of ingress provider edge devices providing traffic to an egress peer node (e.g., where the egress peer node includes only a single egress peer link such that discovery for the egress peer link may be considered to be discovery for the egress peer node as a whole, where the egress peer node includes multiple egress peer links and all of the egress peer links are considered as a whole such that the functions may be considered to be provided for the egress peer node as a whole, or the like).

It will be appreciated that, although primarily presented herein with respect to embodiments in which discovery of a set of ingress provider edge devices providing traffic to an egress peer link for a set of traffic flows is based on use of a particular egress peering capability (namely, EPE), discovery of a set of ingress provider edge devices providing traffic to an egress peer link for a set of traffic flows may be based on various other types of peering capabilities and, thus, EPE-specific references herein may be read more generally (e.g., as egress peering or the like).

It will be appreciated that, although primarily presented herein with respect to embodiments in which discovery of a set of ingress provider edge devices providing traffic to an egress peer link for a set of traffic flows is based on use of a particular control capability for controlling elements of the network (namely, SDN), discovery of a set of ingress provider edge devices providing traffic to an egress peer link for a set of traffic flows may be based on various other types of control capabilities and, thus, SDN-specific references herein (e.g., SDN controller) may be read more generally (e.g., as control device, control element, or the like).

Figure 6:
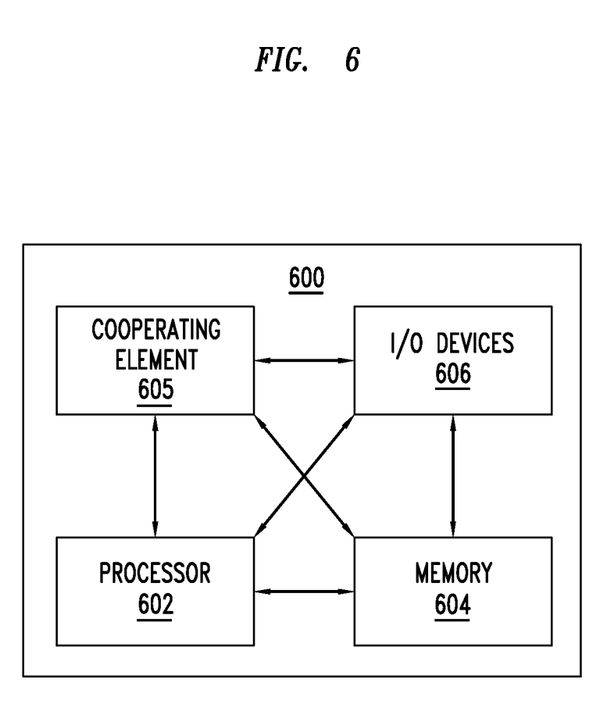
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit (CPU), a processor having a set of processor cores, a processor core of a processor, or the like) and a memory 604 (e.g., a random access memory (RAM), a read only memory (ROM), or the like). The processor 602 and the memory 604 are communicatively connected.

The computer 600 also may include a cooperating element 605. The cooperating element 605 may be a hardware device. The cooperating element 605 may be a process that can be loaded into the memory 604 and executed by the processor 602 to implement functions as discussed herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 of FIG. 6 may represent a general architecture and functionality suitable for implementing functional elements described herein, portions of functional elements described herein, or the like, as well as various combinations thereof. For example, computer 600 may provide a general architecture and functionality that is suitable for implementing one or more of an ingress PE device 111, a BR 119, a provider router 120, a provider router 130, an SDN controller 140, an ingress PE device discovery element 141, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
identify a traffic flow on an egress peer link of an egress peer node;
identify a set of ingress provider edge (PE) devices that have peering relationships with the egress peer node;
determine, for the ingress PE devices based on respective sets of flow statistics associated with the respective ingress PE devices, respective bandwidth usages of the egress peer link by the respective ingress PE devices for the traffic flow;
select, from the set of ingress PE devices based on the respective bandwidth usages of the egress peer link by the respective ingress PE devices for the traffic flow, a selected ingress PE device; and
initiate a management action for the selected ingress PE device.

2. The apparatus of claim 1, wherein, to identify the traffic flow on the egress peer link, the processor is configured to:
receive, from the egress peer node, flow statistics associated with the traffic flow on the egress peer link of the egress peer node; and
identify the traffic flow based on the flow statistics associated with the traffic flow on the egress peer link of the egress peer node.

3. The apparatus of claim 1, wherein, to identify the traffic flow on the egress peer link, the processor is configured to:
receive, from the egress peer node, a plurality of sets of flow statistics associated with a respective plurality of traffic flows supported by the egress peer link of the egress peer node; and
identify the traffic flow, from the plurality of traffic flows supported by the egress peer link of the egress peer node, based on the plurality of sets of flow statistics associated with the respective plurality of traffic flows supported by the egress peer link of the egress peer node.

4. The apparatus of claim 3, wherein the traffic flow comprises one of the plurality of traffic flows having a largest bandwidth on the egress peer link of the egress peer node.

5. The apparatus of claim 1, wherein the peering relationship is based on Egress Peer Engineering (EPE).

6. The apparatus of claim 1, wherein the processor is configured to:
obtain, from the respective ingress PE devices, the respective sets of flow statistics associated with the respective ingress PE devices.

7. The apparatus of claim 6, wherein, to obtain the respective sets of flow statistics associated with the respective ingress PE devices, the processor is configured to:
send, toward the respective ingress PE devices, respective flow rules configured to cause the respective ingress PE devices to collect the respective sets of flow statistics for the traffic flow on the egress peer link of the egress peer node; and
receive, from the respective ingress PE devices, the respective sets of flow statistics for the traffic flow on the egress peer link of the egress peer node.

8. The apparatus of claim 1, wherein, to select the selected ingress PE device, the processor is configured to:
select, from the set of ingress PE devices, one of the ingress PE devices for which the respective bandwidth usage is largest.

9. The apparatus of claim 1, wherein, to initiate the management action, the processor is configured to:

initiate, for the selected ingress PE device, redirection of the traffic flow from being directed from the selected ingress PE device to the egress peer link of the egress peer node to being directed from the selected ingress PE device to a second egress peer link of the egress peer node or a second egress peer node.

10. The apparatus of claim 9, wherein, to initiate redirection of the traffic flow, the processor is configured to:

send, toward the selected ingress PE device, a set of flow forwarding rules configured to cause the selected ingress PE device to direct traffic of the traffic flow toward the second egress peer link instead of toward the egress peer link of the egress peer node.

11. The apparatus of claim 1, wherein the apparatus comprises a software defined networking (SDN) controller.

12. A method, comprising:

identifying, by a processor, a traffic flow on an egress peer link of an egress peer node;

identifying, by the processor, a set of ingress provider edge (PE) devices that have peering relationships with the egress peer node;

determining, by the processor for the ingress PE devices based on respective sets of flow statistics associated with the respective ingress PE devices, respective bandwidth usages of the egress peer link by the respective ingress PE devices for the traffic flow;

selecting, by the processor from the set of ingress PE devices based on the respective bandwidth usages of the egress peer link by the respective ingress PE devices for the traffic flow, a selected ingress PE device; and initiating, by the processor, a management action for the selected ingress PE device.

13. An apparatus, comprising:

a processor and a memory communicatively connected to the processor, the processor configured to:

identify a set of traffic flows on an egress peer node;

identify a set of ingress provider edge (PE) devices that have peering relationships with the egress peer node;

determine bandwidth usage information comprising, for each combination of each of the traffic flows and each of the ingress PE devices, a respective bandwidth usage of the egress peer link by the respective ingress PE device for the respective traffic flow;

select, from a set of ingress PE devices based on the bandwidth usage information, a set of selected ingress PE devices; and initiate a management action for one of the selected ingress PE devices.

* * * * *